United States Patent [19]

Miyauchi et al.

[11] Patent Number: 5,774,280

[45] Date of Patent: Jun. 30, 1998

[54] LENS BARREL AND OPTICAL APPARATUS

[75] Inventors: Kenji Miyauchi; Masatoshi Nagano, both of Tokyo, Japan

[73] Assignee: Canon Kabushiki Kaisha, Tokyo, Japan

[21] Appl. No.: 691,705

[22] Filed: Aug. 2, 1996

[30] Foreign Application Priority Data

Aug. 25, 1995 [JP] Japan .................................. 7-240746
Aug. 25, 1995 [JP] Japan .................................. 7-240747

[51] Int. Cl.$^6$ .................................................. G02B 7/02
[52] U.S. Cl. ...................... 359/819; 359/811; 359/823; 396/529; 396/535
[58] Field of Search .................................. 359/808, 811, 359/812, 819, 822, 823, 694, 696, 704; 396/529, 535

[56] References Cited

U.S. PATENT DOCUMENTS

| 4,927,237 | 5/1990 | Hart | 359/819 |
| 4,961,637 | 10/1990 | Ou | 359/819 |
| 5,040,873 | 8/1991 | Takamatsu et al. | 359/808 |
| 5,177,638 | 1/1993 | Emura et al. | 359/704 |
| 5,202,706 | 4/1993 | Hasegawa | 359/819 |

FOREIGN PATENT DOCUMENTS

| 62-299920 | 12/1987 | Japan | 359/819 |
| 6-3573 | 1/1994 | Japan . | |
| 6-34862 | 2/1994 | Japan . | |
| 6-75151 | 3/1994 | Japan . | |

*Primary Examiner*—Loha Ben
*Attorney, Agent, or Firm*—Fitzpatrick, Cella, Harper & Scinto

[57] ABSTRACT

A lens barrel includes of a first housing half and a second housing half. The first housing half is arranged to house a first member, and the second housing half is arranged to house a second member. A housing is formed by joining the first housing half and the second housing half to each other at a first boundary plane which includes an optical axis or a second boundary plane which is adjacent to the first boundary plane. A lens barrel includes a housing divided into a first housing half and a second housing half by a first boundary plane which includes an optical axis or by a second boundary plane which is adjacent to the first plane, an optical element housed in the first housing half, and a driving part housed in the second housing half. The first housing half and the second housing half are put together at the first boundary plane or the second boundary plane after the optical element and the driving part are housed.

10 Claims, 5 Drawing Sheets

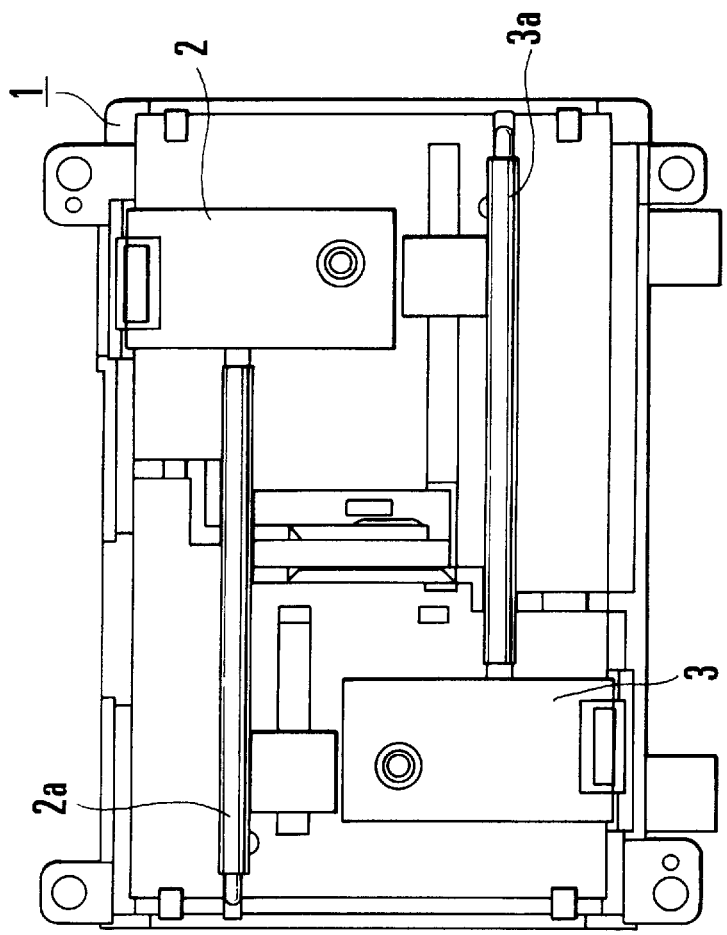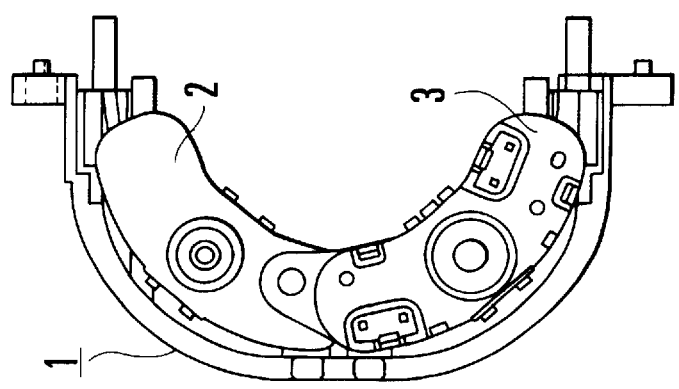

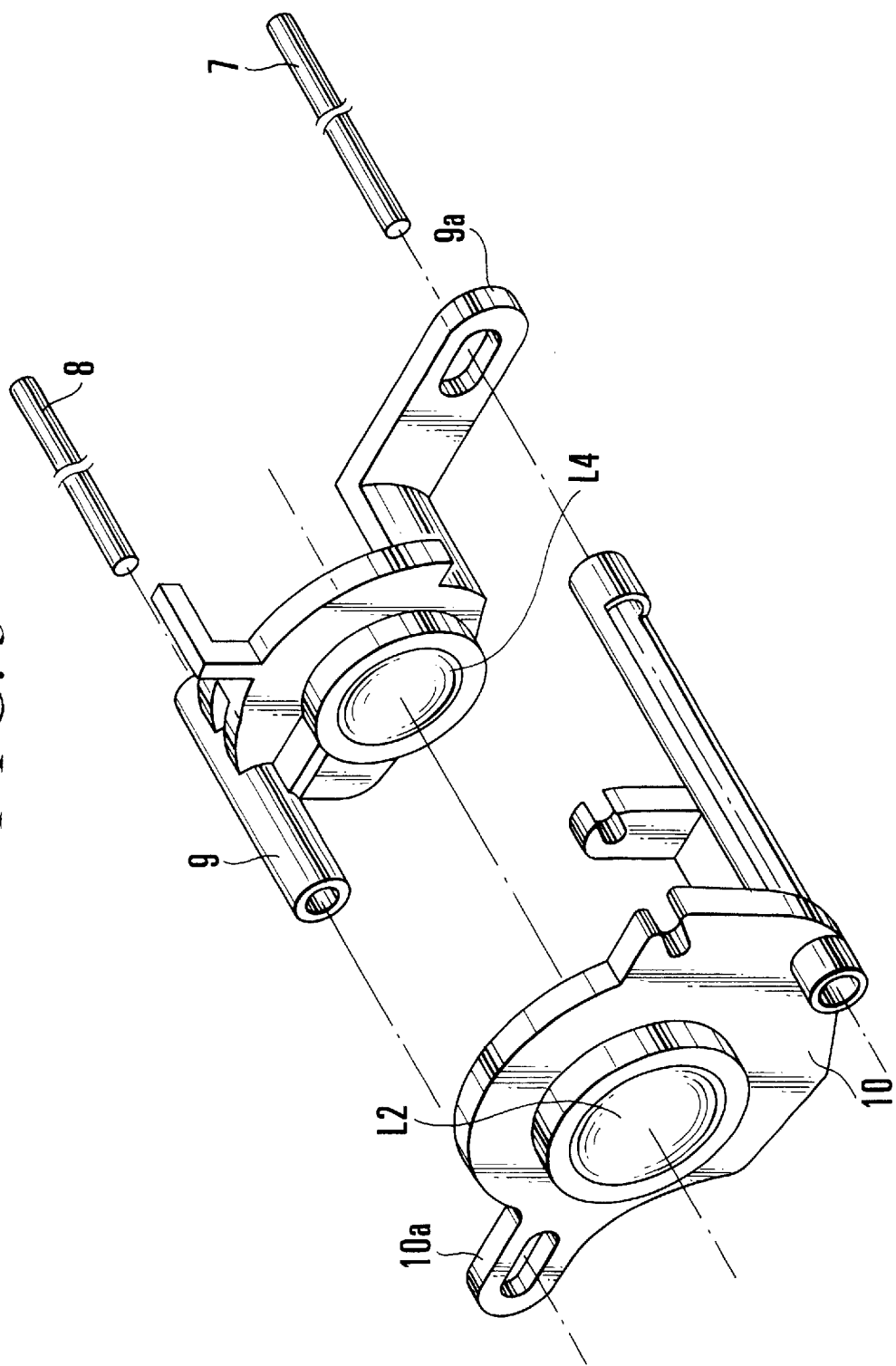

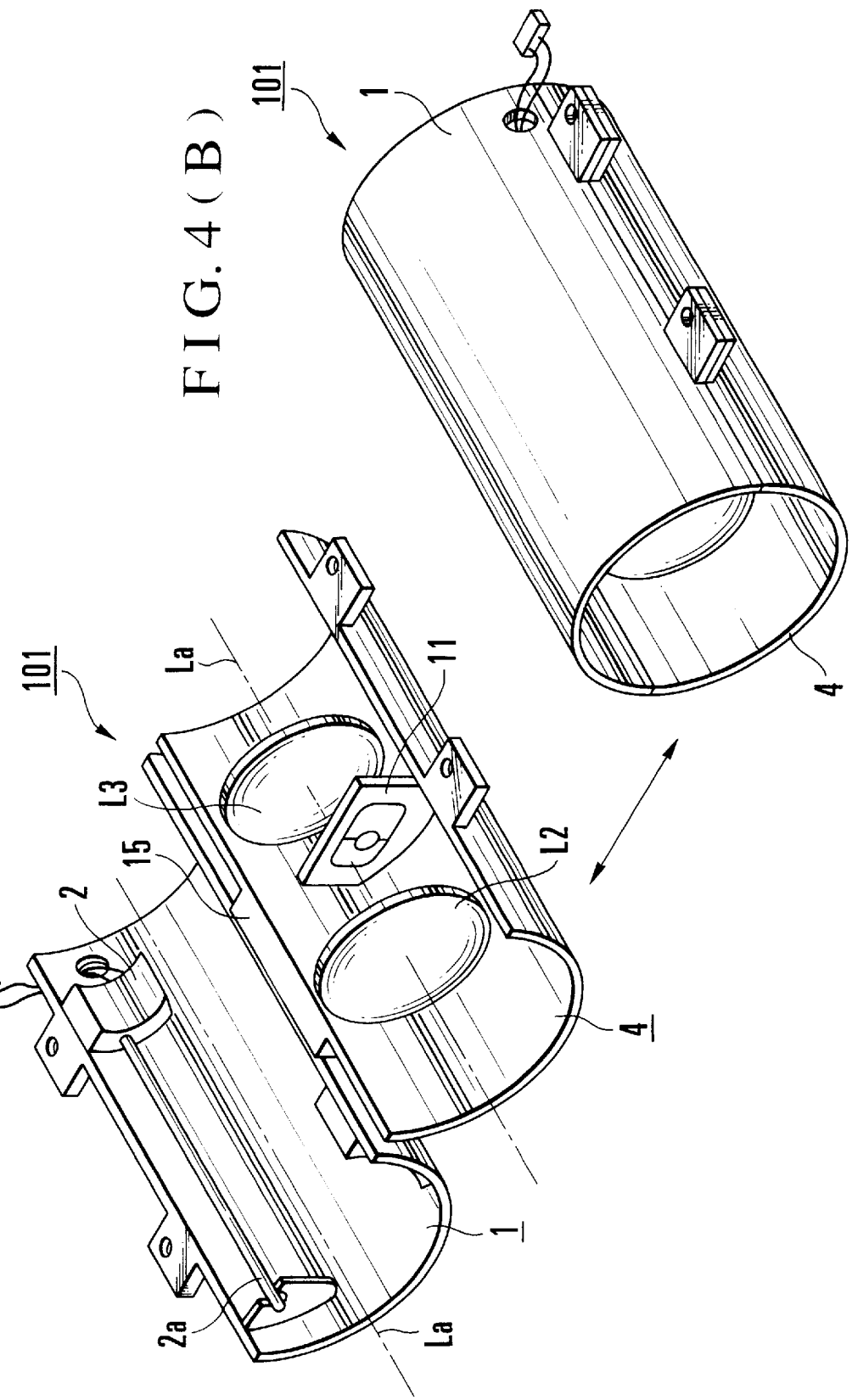

LENS BARREL AND OPTICAL APPARATUS

BACKGROUND OF THE INVENTION

1. Field of the Invention

This invention relates to a lens barrel and an optical apparatus and more particularly to a lens barrel advantageously adapted for a compact camera or a camera-integrated type video tape recorder.

2. Description of the Related Art

Some known lens barrels have been arranged to have a base housing formed in a box-like shape, to have a photo-taking lens, iris, shutter means and driving means of varied kinds (such as a focusing motor and a zooming motor), housed and held within the base housing, and to have an opening part of the base housing closed with a flat member.

The conventional arrangement in which the lens barrel is completed by housing and holding various members within a box-like housing and closing the box-like housing with a flat plate-like member, however, has presented a problem in that the component elements of the lens barrel cannot be easily and accurately housed and held in their predetermined positions.

Further, since a plurality of driving means are, for example, arranged in a vertical direction with respect to an optical axis within the box-like base housing, the dimension of the lens barrel in the direction of its height is caused to increase. Therefore, the conventional arrangement tends to increase the size of the lens barrel as a whole.

SUMMARY OF THE INVENTION

It is a principal object of this invention to provide a lens barrel and an optical apparatus arranged to permit easy and accurate assembly work on the component elements of the lens barrel within a housing.

It is another object of this invention to provide a lens barrel and an optical apparatus configured in a compact shape.

In accordance with a first aspect of this invention, to attain the above-stated objects, there is provided a lens barrel comprising a first housing half, the first housing half being arranged to house a first member, and a second housing half, the second housing half being arranged to house a second member, wherein a housing is formed by joining the first housing half and the second housing half to each other at a first boundary plane which includes an optical axis or a second boundary plane which is adjacent to the first boundary plane.

In accordance with a second aspect of this invention, to attain the above-stated objects, there is provided a lens barrel comprising a first housing half, the first housing half being arranged to house a movable element, and a second housing half, the second housing half being arranged to house a driving mechanism for moving the movable element, wherein a housing is formed by joining the first housing half and the second housing half to each other at a first boundary plane which includes an optical axis or a second boundary plane which is adjacent to the first boundary plane.

In accordance with a specific feature of this invention, the driving mechanism includes a drive source and driving-force transmitting means for transmitting a driving force of the drive source, and when the first housing half and the second housing half are joined to each other, the driving-force transmitting means is connected to the movable element in such a manner as to be relatively movable.

In accordance with another specific feature of this invention, a lens is housed in one of the first housing half and the second housing half, and in another of the first housing half and the second housing half a fixing member for fixing the lens by holding the lens when the first housing half and the second housing half are joined to each other is housed.

In accordance with a third aspect of this invention, there is provided a lens barrel comprising a first housing half, the first housing half being arranged to house a first movable element and a second movable element, and a second housing half, the second housing half being arranged to house in diagonal positions a first driving mechanism for moving the first movable element and a second driving mechanism for moving the second movable element, wherein a housing is formed by joining the first housing half and the second housing half to each other at a first boundary plane which includes an optical axis or a second boundary plane which is adjacent to the first boundary plane.

In accordance with another aspect of this invention, there is provided an optical apparatus for forming image information by using any one of the lens barrels defined above.

The above and other objects and features of this invention will become apparent from the following detailed description of embodiments thereof taken in connection with the accompanying drawings.

BRIEF DESCRIPTION OF THE DRAWINGS

FIGS. 2(A) and 2(B) are a front view and a side view, respectively, showing the first embodiment of this invention.

FIG. 3 is an oblique view showing in part a second embodiment of this invention.

FIGS. 4(A) and 4(B) are oblique views showing in part a third embodiment of this invention.

DETAILED DESCRIPTION OF THE PREFERRED EMBODIMENTS

Figure 1:
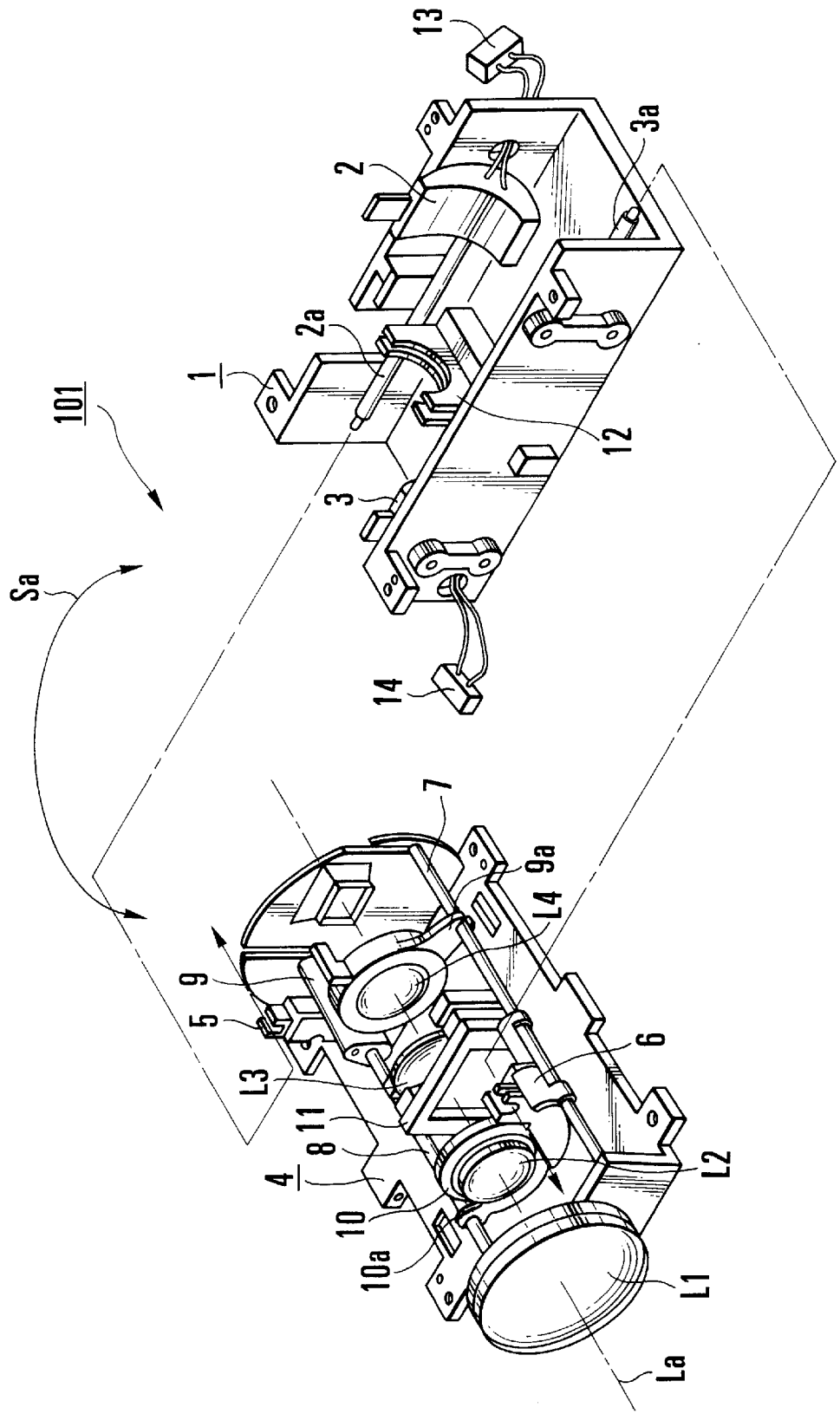
FIG. 1 is an oblique view showing a first embodiment of this invention.

A first embodiment of this invention is shown in an oblique view by FIG. 1. FIGS. 2(A) and 2(B) are a front view and a side view of a part (driving system housing) of FIG. 1, respectively.

Referring to FIG. 1, a lens barrel 101 according to the first embodiment of this invention includes a housing which is in a circular, elliptic or square cylindrical shape or any other arbitrary external shape such as a polygonal shape, as viewed in a section perpendicular to an optical axis thereof. The lens barrel 101 is divided into two elements (housing halves), i.e., a lens system housing (lens housing half) 4 and a driving system housing (driving housing half) 1 by a boundary plane which includes an optical axis La or a boundary plane which is in parallel and near to the boundary plane including the optical axis La. In FIG. 1, an arrow Sa indicates a direction in which the lens system housing 4 and the driving system housing 1 are put together into one unit, i.e., the lens barrel 101, and a direction in which the lens barrel 101 is divided.

First, photo-taking elements, such as a photo-taking lens system (L1 to L4), which are housed and held within the lens system housing 4 are described as follows.

The photo-taking lens system includes a fixed lens L1 and a movable lens L2 which is movable in the direction of the optical axis in varying a magnifying power and is held by a lens holding frame 10. A drive transmission member 6 is arranged to move the lens holding frame 10 in the direction of the optical axis with a driving force transmitted from a driving screw (drive transmission element) 3a of a driving means 3 which will be described later.

A fixed lens L3 is positioned and fixed by utilizing a holding part 12 provided in the driving system housing 1 when the lens system housing 4 and the driving system housing 1 have been put together into one unit. A movable lens L4 is movable in the direction of the optical axis when a magnification varying action and a focusing action are performed and is held by a lens holding frame 9. A drive transmission member 5 is arranged to move the lens holding frame 9 in the direction of the optical axis with a driving force transmitted from a driving screw (drive transmission element) 2a of a driving means 2 which will be described later.

Guide bars 7 and 8 are arranged to guide the lens holding frames 10 and 9 to be moved in the direction of the optical axis. The guide bars 7 and 8 act to determine not only the dropping positions of U-shaped grooves which are provided in the lens holding frames 10 and 9 but also those of angular grooves provided in vertical wall parts which are located in front and rear parts of the lens system housing 4. The guide bars 7 and 8 are fitted into laterally U-shaped engaging parts 10a and 9a formed in the lens holding frames 10 and 9. Iris means 11 is disposed in between the movable lens L2 and the fixed lens L3.

In the case of this embodiment, a viewfinder system, a focus detecting system, etc. which are not shown are also housed in the lens system housing 4.

Next, driving means including motors, driving members etc., which are housed and held in the driving system housing 1 is described as follows.

The driving means (AF motor) 2, which is in an arcuate shape, is arranged to cause the movable lens L4 to move in the direction of the optical axis for adjustment of focus by rotating the driving screw 2a according to an AF signal obtained from a focus detecting system (not shown) through a wire harness 13. The driving means (zoom motor) 3, which is also in an arcuate shape, is arranged to cause the movable lens L2 to move in the direction of the optical axis for zooming by rotating the driving screw 3a according to a zoom signal obtained through a wire harness 14. Further, in the zooming operation, the movable lens L4 is also moved in the direction of the optical axis by means of the driving means 2 and the driving screw 2a.

In the case of this embodiment, each of the driving means 2 and 3 is formed in a shape (an arcuate shape in this case) which is about the same as the inner side shape of the driving system housing 1. In addition, the driving means 2 and 3 are disposed in diagonal positions with respect to the direction of the optical axis along a plane which is in parallel to the plane of the opening of the driving system housing 1. The driving means 2 and 3 are thus housed and held within the driving system housing 1 in such a way as to effectively prevent the outside diameter of the driving system housing 1 from increasing, by effectively utilizing a space available within the driving system housing 1.

With the lens barrel 101 arranged as described above, an optical apparatus is formed by mounting the lens barrel 101 on the camera body (not shown), so that an image of an object of shooting (image information) is formed on a predetermined plane, i.e., a photosensitive plane. In the case of the first embodiment, the photosensitive plane corresponds to a light receiving surface of a CCD which is employed as an image sensor.

FIG. 3 is an oblique view showing a part of a second embodiment of this invention. In the second embodiment, each of lens holding frames 10 and 9 is arranged to have an engaging part 10a or 9a which is formed in a protruding elliptic shape, and a guide bar 8 or 7 is inserted in the engaging part 10a or 9a, so that movable lenses L2 and L4 are unitized. Accordingly, four elements (L2, L4, 7 and 8) are simultaneously housed and held in the driving system housing 1. With the exception of these parts, all other parts are arranged in the same manner as shown in FIGS. 1, 2(A) and 2(B).

FIGS. 4(A) and 4(B) are oblique views showing a third embodiment of this invention. The third embodiment is arranged in the same manner as the first embodiment with the exception of the following point. As shown in FIG. 4(A), the lens barrel 101 is divided into two housing halves (a driving system housing 1 and a lens system housing 4) by a boundary plane including an optical axis La of a phototaking lens system. The two housing halves 1 and 4 are put together by turning them relative to each other through a hinge part 15. The appearance of the lens barrel 101 with the two housing halves 1 and 4 put together is as shown in FIG. 4(B).

The driving means (AF motor) 2 and the driving means (zoom motor) 3 are disposed in diagonal positions with respect to the optical axis La along the inner side of the driving system housing 1. Accordingly, the space available inside the driving system housing 1 is effectively utilized to permit a high degree of integration of the inside of the driving system housing 1 and a reduction in size of the whole lens barrel 101. Further, the arrangement of connecting the two housing halves 1 and 4 at the hinge part 15 facilitates assembly by carrying out position adjustment in the direction of the optical axis La and in a direction perpendicular to the optical axis La.

Figure 5:
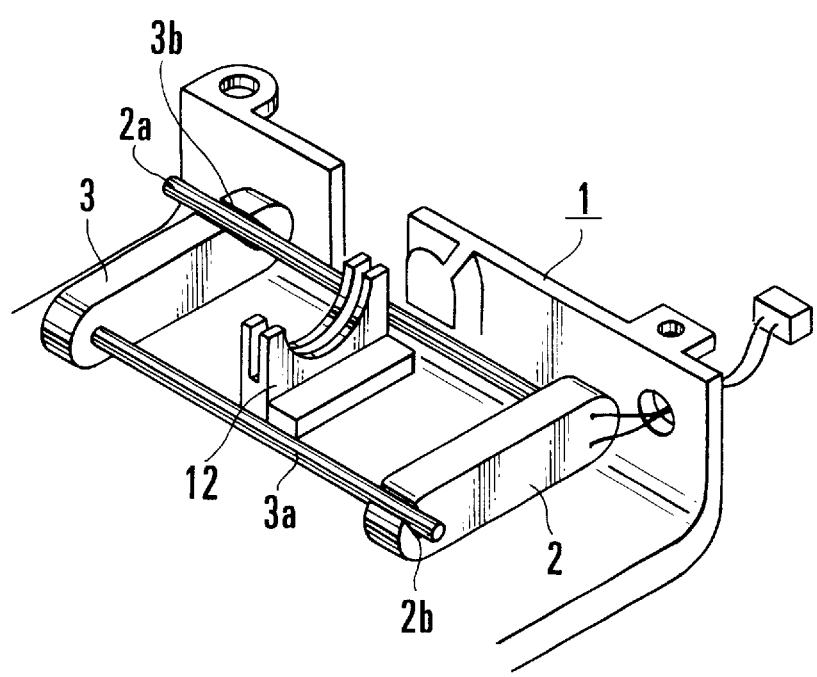
FIG. 5 is an oblique view showing in part a fourth embodiment of this invention.

FIG. 5 is an oblique view showing in part a fourth embodiment of this invention. In FIG. 5, only a driving system housing 1 is shown. In this embodiment, two driving means (motors) 2 and 3 are arranged in a state of being opposed to each other within the driving system housing 1. Each of the driving means 2 and 3 is provided with a bearing 2b or 3b which is formed as a part of the opposed driving means (motor) for a driving shaft screw 2a or 3a. With the exception of this point, the fourth embodiment is arranged in the same manner as the first embodiment. According to the arrangement of the fourth embodiment, the two driving means (motors) 2 and 3 can be simultaneously mounted in positions within the driving system housing 1 without difficulty.

According to each of the embodiments described above, the housing of the lens barrel is divided into housing halves by a boundary plane including the optical axis or by a boundary plane which is in parallel to the plane including the optical axis. The two housing halves are arranged to house and hold the component elements of the lens barrel in such a way as to permit a high degree of integration of the housing for reduction in size and accurate positioning and assembly work on the component elements within the housing halves. In accordance with this invention, a lens barrel and an optical apparatus using the lens barrel thus can be adequately arranged.

What is claimed is:

1. A lens barrel comprising:
   a first housing half, said first housing half holding a first member; and
   a second housing half, said second housing half holding a second member, wherein a housing is formed by joining said first housing half and said second housing half to each other at one of a first boundary plane which includes an optical axis and a second boundary plane which is adjacent to the first boundary plane.

2. A lens barrel comprising:

a first housing half, said first housing half holding a movable element; and a second housing half, said second housing half holding a driving mechanism for moving said movable element, wherein a housing is formed by joining said first housing half and said second housing half to each other at one of a first boundary plane which includes an optical axis and a second boundary plane which is adjacent to the first boundary plane.

3. A lens barrel according to claim 2, wherein said driving mechanism includes a drive source and driving-force transmitting means for transmitting a driving force of said drive source, and wherein, when said first housing half and said second housing half are joined to each other, said driving-force transmitting means is connected to said movable element in such a manner as to be relatively movable.

4. A lens barrel according to claim 3, wherein a lens is housed in one of said first housing half and said second housing half, and in another of said first housing half and said second housing half a fixing member for fixing said lens by holding said lens when said first housing half and said second housing half are joined to each other is housed.

5. A lens barrel according to claim 2, wherein said movable element includes a lens arranged to move in a direction of the optical axis, and wherein said driving mechanism includes a motor and a driving screw for transmitting a rotation of said motor.

6. A lens barrel comprising:

a first housing half, said first housing half holding a first movable element and a second movable element; and a second housing half, said second housing half holding in diagonal positions a first driving mechanism for moving said first movable element and a second driving mechanism for moving said second movable element, wherein a housing is formed by joining said first housing half and said second housing half to each other at one of a first boundary plane which includes an optical axis and a second boundary plane which is adjacent to the first boundary plane.

7. A lens barrel according to claim 6, wherein each of said first movable element and said second movable element includes a lens arranged to move in a direction of the optical axis, and wherein each of said first driving mechanism and said second driving mechanism includes a motor and a driving screw for transmitting a rotation of said motor.

8. An optical apparatus for forming image information by using a lens barrel claimed in any one of claims 1 to 7.

9. A lens barrel according to claim 1, wherein the first member includes a movable element, said element being an optical element.

10. A lens barrel according to claim 9, wherein the optical element includes a lens.

* * * * *